United States Patent
Prithviraj et al.

(10) Patent No.: US 12,440,110 B1
(45) Date of Patent: Oct. 14, 2025

(54) SYSTEMS FOR DETERMINING PHYSIOLOGICAL VALUES BASED ON SIGNAL CHARACTERISTICS

(71) Applicant: AMAZON TECHNOLOGIES, INC., Seattle, WA (US)

(72) Inventors: Anantharanga Prithviraj, Santa Clara, CA (US); Sichao Shi, Bellevue, WA (US); Haithem Albadawi, Redmond, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 1008 days.

(21) Appl. No.: 17/449,342

(22) Filed: Sep. 29, 2021

(51) Int. Cl.
| | |
|---|---|
| *A61B 5/0205* | (2006.01) |
| *A61B 5/00* | (2006.01) |
| *A61B 5/024* | (2006.01) |
| *A61B 5/026* | (2006.01) |
| *A61B 5/08* | (2006.01) |
| *A61B 5/1455* | (2006.01) |

(52) U.S. Cl.
CPC ........ *A61B 5/0205* (2013.01); *A61B 5/02416* (2013.01); *A61B 5/0261* (2013.01); *A61B 5/0816* (2013.01); *A61B 5/14551* (2013.01); *A61B 5/7235* (2013.01); *A61B 5/6801* (2013.01)

(58) Field of Classification Search
CPC . A61B 5/0205; A61B 5/02416; A61B 5/0261; A61B 5/0816; A61B 5/14551; A61B 5/7235; A61B 5/6801
See application file for complete search history.

(56) References Cited

U.S. PATENT DOCUMENTS

2017/0156609 A1\* 6/2017 Yuan .................. A61B 5/02416

OTHER PUBLICATIONS

"Scipy.signal.find_peaks", SciPy documentation, 5 pgs. Retrieved from the Internet: URL: https://docs.scipy.org/doc/scipy/reference/generated/scipy.signal.find_peaks.html.
Tournade, Yoan, "Peak Detection in the Python World", Simple, distrubuted software., YtoTech, Nov. 1, 2015, 8 pgs. Retrieved from the Internet: URL: https://blog.ytotech.com/2015/11/01/findpeaks-in-python/.

\* cited by examiner

*Primary Examiner* — Eric F Winakur
(74) *Attorney, Agent, or Firm* — Lindauer Law, PLLC

(57) ABSTRACT

A photoplethysmogram (PPG) signal may be used to determine values representing a pulse rate, oxygen saturation, or respiration rate of a user by determining data points of the signal that correspond to local maxima (peaks) and local minima (valleys). Peaks and valleys are identified based on the directional components of sets of points that precede and follow the peak or valley, and values for one or more of those points relative to the value for the peak or valley. Once peaks and valleys of the signal are identified, lengths of time between adjacent peaks or valleys may be used to determine pulse rate. Differences in values represented by an adjacent peak and valley for different wavelengths of the PPG signal may be used to determine oxygen saturation. Changes in distances between adjacent peaks or valleys and amplitude of the PPG signal over time may be used to determine respiration rate.

20 Claims, 6 Drawing Sheets

TIME = T4: DETERMINE MAXIMA AND MINIMA BASED ON SCORES

TIME = T5: DETERMINE PHYSIOLOGICAL VALUES BASED ON MAXIMA AND MINIMA

SYSTEMS FOR DETERMINING PHYSIOLOGICAL VALUES BASED ON SIGNAL CHARACTERISTICS

BACKGROUND

Signals from a photoplethysmography (PPG) sensor may be used to determine various physiological values associated with a user, such as a pulse rate. Techniques that infer other physiological values from characteristics of a PPG signal may be inaccurate or inefficient.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

Figure 1:
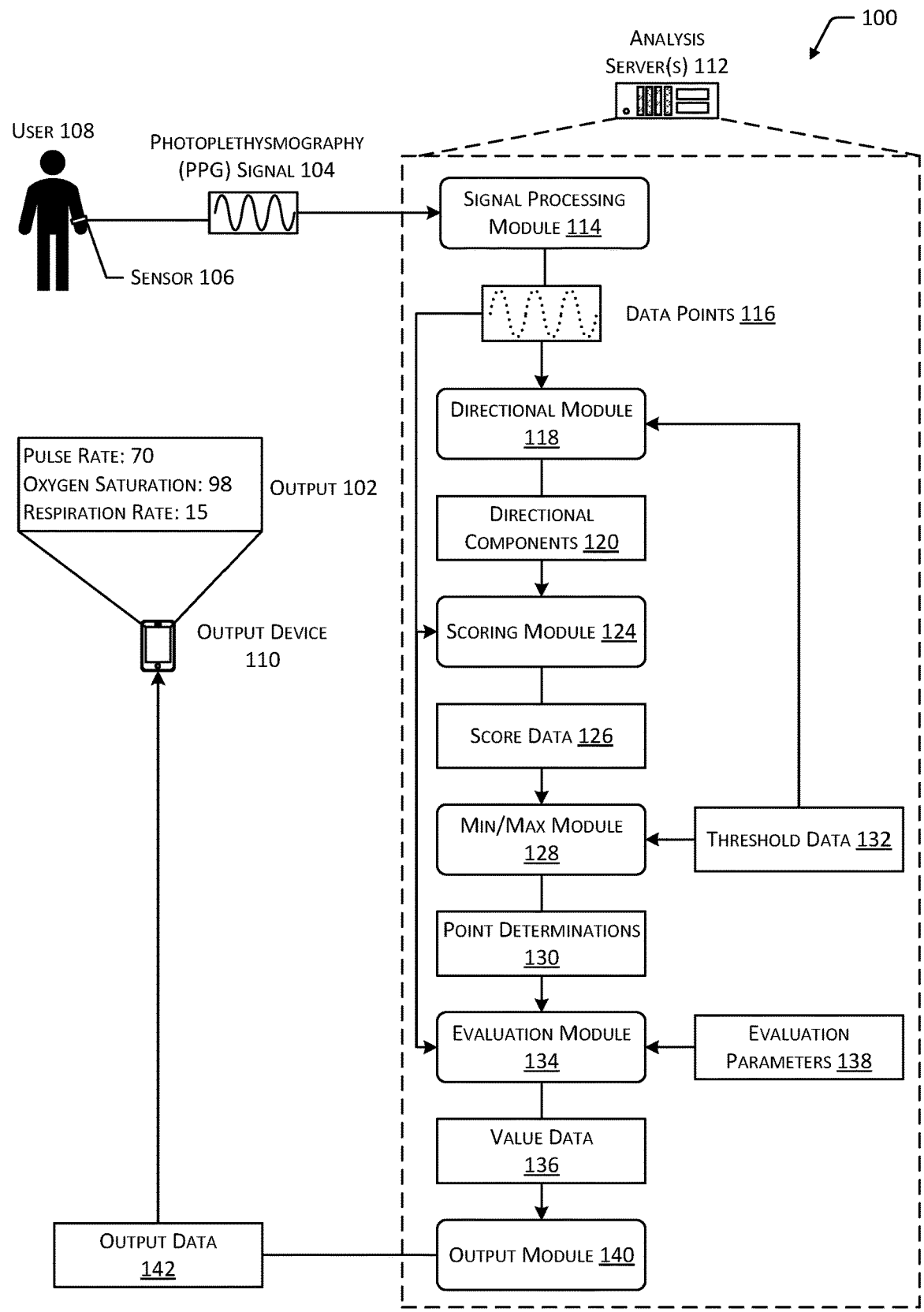
FIG. 1 is a diagram depicting an implementation of a system for determining output indicative of one or more physiological values based on a photoplethysmography signal.

While implementations are described in this disclosure by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used in this disclosure are for organizational purposes only and are not meant to be used to limit the scope of the description or the claims. As used throughout this application, the word "may" is used in a permissive sense (i.e., meaning having the potential to) rather than the mandatory sense (i.e., meaning must). Similarly, the words "include", "including", and "includes" mean "including, but not limited to".

DETAILED DESCRIPTION

Wearable devices may be used to acquire physiological data using a variety of sensors. A photoplethysmography (PPG) sensor uses optical techniques to detect volumetric changes in blood in peripheral circulation. For example, a PPG sensor may emit light at various wavelengths from one or more light emitting diodes (LED) or other types of light sources. A detector associated with the PPG sensor may detect light that is at least partially reflected, diffused, fluoresced, or otherwise interacts with a user's body in a manner that may be detected by the detector. Based on characteristics of the reflected light, one or more physiological values of the user may be determined. In some cases, a PPG signal may represent changes in blood flow as a waveform signal having alternating current (AC) and direct current (DC) components based on different channels of the signal that correspond to different wavelengths of light. For example, a PPG sensor may emit light having different wavelengths using green, red, and infrared light sources, and the different wavelengths of light may interact with the body of a user differently. Continuing the example, an AC component of a PPG signal may correspond primarily to variations in blood volume detected using a first wavelength of light and may be affected more strongly by pulse rate, while a DC component of the PPG signal may correspond primarily to light having a second wavelength that is reflected by both tissue and blood volume in the user's body and may vary more strongly based on respiration. The information determined from a PPG signal relating to blood flow changes within a user's body may be used to infer physiological values such as pulse rate, oxygen saturation (SpO2), respiration rate, and so forth. However, inferring physiological values from a PPG signal may rely on the ability to accurately and efficiently characterize portions of the signal, such as local maxima (peaks) and local minima (valleys).

Described in this disclosure are techniques for analyzing a PPG signal, or another type of signal, to determine particular data points that are local maxima and local minima within the signal. The determined local maxima and local minima may then be used to determine values representing a pulse rate, oxygen saturation, or respiration rate of a user. A PPG signal may include a potentially large number of data points, which may be represented as a graph in which each data point is associated with a particular time and a particular value (e.g., amplitude of the signal). Each data point within the PPG signal may be a local maximum, a local minimum, or neither a local maximum nor a local minimum. For example, the location of a local maximum within a PPG signal may correspond to a time when the systolic portion of a user's heartbeat occurred, while the location of a local minimum subsequent to the local maximum may correspond to the diastolic portion of the user's heartbeat. The locations of local maxima and local minima within the PPG signal may be determined based on directional components of each data point within the signal. A directional component for a data point is an indication of a change in value for the data point relative to the immediately previous data point. For example, the value for each data point in a PPG signal may be compared to the value of a preceding data point to determine whether the value for a particular data point has increased by at least a threshold amount, decreased by at least a threshold amount, or remained at a similar value within a threshold, when compared to the value for a preceding data point. If the value for a given data point has increased relative to the value for a preceding data point by at least the threshold amount, the data point may be associated with a directional component such as "increasing". If the value for the given data point has decreased relative to the value of the preceding data point by at least the threshold amount, the data point may be associated with a directional component of "decreasing". If the value for the given data point is within the threshold amount of the value for the preceding data point, the given data point may be associated with a directional component of "similar". A data point may be a local maximum when the data point is preceded by one or more data points having an increasing directional component, followed by one or more data points having a decreasing directional component, or both preceded by increasing data points and followed by decreasing data points. Similarly, a data point may be local minimum when the data point is preceded by one or more decreasing data points, followed by one or more increasing data points, or both preceded by decreasing data points and followed by increasing data points.

In some implementations, for each data point, a prominence score may be determined that may indicate the likelihood of the data point being a local maximum or local minimum. The prominence score may be determined based on the directional component of sets of data points that precede and follow a particular data point. For example, a directional component of "increasing" may be associated with a value of 1, a directional component of "decreasing" may be associated with a value of −1, and a directional component of "similar" may be associated with a value of 0. For a given data point, a prominence score may be determined by summing the directional components of a set of data points (such as four data points) that precede the given data point, and subtracting the sum of the directional components of a set of data points (such as four data points) that follow the given data point. For example, the maximum prominence score when two sets of four data points are used would be 8, if four data points preceding a given data point are increasing (a value of 1 for each) and four data points following the given data point are decreasing (a value of −1 for each). The minimum prominence score would similarly be −8, if each data point preceding a given data point is decreasing and each data point following the given data point is increasing. A prominence score that is greater than a first threshold value may indicate that a data point is a local maximum. A prominence score less than a second threshold value may indicate that the data point is a local minimum. In other implementations, a classifier or other type of machine learning algorithm may determine local maxima, local minima, and points that are neither local maxima nor local minima based on training data, labeled data, previously classified data, or other existing data that associates absolute or relative values for prominence scores of data points with corresponding classifications.

In some implementations, for each data point, a strength score may be determined, in addition to or in place of a prominence score. The strength score may also indicate the likelihood of the data point being a local maximum or local minimum. The strength score for a given data point may be determined based on the value for the given data point, the value for a data point within a set of data points that precedes the given data point (such an initial data point within a set of four data points that precede the given data point), and the value for a data point within a set of data points that follows the given data point (such as a terminal or last data point within a set of four data points that follow the given data point). For a given data point, a strength score may be determined by subtracting the value for a point that precedes the given data point from the value for the given data point, then adding this value to the difference determined by subtracting a value for a point that follows the given data point from the value for the given data point. Therefore, a high strength score that is greater than a selected threshold value may indicate that the data point is a local maximum, while a low strength score that is less than a selected threshold value may indicate that the data point is a local minimum. In other implementations, a classifier or other type of machine learning algorithm may determine local maxima, local minima, and points that are neither local maxima nor local minima based on strength scores for one or more data points.

In some cases, both prominence scores and strength scores may be determined for at least a subset of the data points. For example, for a given data point, if the prominence score is greater than a first threshold and the strength score is greater than a second threshold, this may indicate that the given data point is a local maximum. If the prominence score is less than a third threshold and the strength score is less than a fourth threshold, this may indicate that the given data point is a local minimum. If neither of these sets of conditions is met, this may indicate that the given data point is neither a local maximum nor a local minimum. In other cases, a classifier or other type of machine learning algorithm may be used to classify combinations of prominence scores and strength scores as local maxima, local minima, or neither local maxima nor local minima.

After determining at least a subset of the local maxima and local minima represented by a signal, the determined points may be used to calculate one or more physiological values associated with a user. For example, the distance between adjacent local maxima or between adjacent local minima may be used to determine a pulse rate value. Continuing the example, the location of each data point within a signal may correspond to a time associated with the data point. Therefore, the distance between two data points may correspond to a length of time that elapsed between determination of the two data points. Because each local maximum represents a time when the systolic portion of a user's heartbeat occurred and each local minimum represents a time when the diastolic portion of the user's heartbeat occurred, the locations of local maxima and local minima may be used to determine a number of heartbeats that occurred over a selected period of time, which may be represented as a pulse rate value associated with the user.

In some implementations, data points that are determined to be local maxima and local minima within the signal may be used to determine an oxygen saturation value associated with a user. For example, an oxygen saturation value may be determined based on a perfusion index (a blood volume variation) measurement, determined based on a PPG signal, using different wavelengths of light. Continuing the example, a perfusion index for a particular heartbeat (a local maximum and local minimum pair within a PPG signal) may be calculated by determining the AC component of the PPG signal and dividing this value by the DC component. The AC component may be determined by subtracting the value of the local minimum from the value for the local maximum. The DC component may be the mean of the values for the local maximum and the local minimum. The perfusion index may be determined by dividing the value for the AC component by the value of the DC component. For a greater portion of a signal, an average of multiple perfusion index values for multiple local maximum and local minimum pairs may be used. Because different wavelengths of light interact differently with portions of a user's body, perfusion index values determined using different channels of a signal may be different. For example, green, red, and infrared light emitted by different LEDs may each be used to determine different perfusion index values. An oxygen saturation value may be determined by dividing the perfusion index determined using a first channel, such as a channel corresponding to light having a wavelength of about 660 nanometers (nm) (e.g., red light), by the perfusion index determined using a second channel, such as a channel corresponding to light having a wavelength of about 940 nm (e.g., infrared light).

In some implementations, a first channel associated with a signal may be used to determine locations of local maxima and local minima within the signal, while one or more other channels may be used to determine physiological values associated with a user. For example, using the techniques described above, data points determined based on detecting the interactions with light from a green LED having a first wavelength may be used to determine locations of local maxima and local minima within the signal. Then, corresponding points at the same location in other channels, such as light emitted using red and infrared LEDs, may be used to determine values associated with perfusion index, oxygen saturation, and so forth. For example, if a particular channel of a signal is associated with greater quality or accuracy, use of the particular channel to locate local maxima and minima may enable more accurate values to be determined using data from other channels by using values associated with points having corresponding locations to those of the local maxima and local minima determined using the first channel.

In some implementations, data points that are determined to be local maxima and local minima within the signal may be used to determine a respiratory rate value associated with a user. As a user inhales and exhales, characteristics of a PPG signal, such as the values (e.g., amplitude) of both local maxima and local minima may change in a cyclical or periodic manner. For example, the amplitude of a PPG signal may increase as a user inhales and decrease as a user exhales. Additionally, as the user inhales and exhales, the perfusion index that may be determined using a PPG signal may change. For example, the distance between a local maximum and a local minimum that immediately follows the local maximum may increase as a user inhales and decrease as a user exhales. Further, as the user inhales and exhales, the interbeat interval (e.g., the time between individual beats of a heart) may change, which may result in a change in distance between adjacent local maxima or local minima within a PPG signal. The techniques described above to determine locations of local maxima and local minima may be used for one or more of the above measurements to determine a respiratory rate value associated with a user. For example, a graph that indicates the change in amplitude of a PPG signal over time may include local maxima and local minima that correspond to inhalation and exhalation breath movements of a user, and the distance between adjacent local maxima or local minima may be used to calculate a number of breaths for a period of time. Similarly, a graph that indicates the change in perfusion index associated with local maximum and local minimum pairs in a PPG signal may itself have local maxima and local minima that correspond to breath movements of the user. Further, a graph that indicates the change in interbeat intervals over time may have local maxima and local minima that correspond to breath movements. In other cases, a frequency band pass filter or Fourier transform process may be used to determine locations of local maxima and minima within these characteristics, which may be used to determine a respiratory rate value for a user.

Accurate location of local maxima (peaks) and local minima (valleys) within a PPG signal, or another type of signal, through use of prominence scores, strength scores, or both, may therefore facilitate efficient and accurate determination of various values, such as pulse rate, oxygen saturation, and respiratory rate. Determined physiological values, or other types of values based on a signal, may be obtained in addition to or without use of frequency filtering techniques, statistical analysis, and so forth, which may conserve time and computational resources while enabling accurate values to be determined.

FIG. 1 is a diagram 100 depicting an implementation of a system for determining output 102 indicative of one or more physiological values based on a photoplethysmography signal 104. One or more sensors 106 that may be worn, carried, or otherwise associated with the body of a user 108 may be used to determine the photoplethysmography (PPG) signal 104. For example, a wearable computing device may include a PPG sensor 106, one or more other sensors, one or more input devices, one or more output devices 110, such as displays or speakers, and so forth. Continuing the example, the wearable computing device may include a health or fitness tracking device that is used to determine physiological values associated with the user 108 during a selected period of time and store data or present output 102 indicative of the determined physiological values. In other implementations, a device that is carried by the user 108, positioned in an environment with the user 108, or held by an individual other than the user 108, and oriented in a manner to acquire a PPG signal 104 from the user 108 may be used. The PPG sensor 106 may include one or more light emitting diodes (LEDs) or other light sources that emit light toward the body of a user 108, and a detector that detects light that is reflected, refracted, diffused, or otherwise affected by the skin or other parts of the body of the user 108. Physiological characteristics of the user 108 may then be determined based at least in part on light detected by the sensor 106.

In other implementations, a sensor 106 may emit other types of signals that may be reflected or otherwise affected by the body of the user 108. For example, the sensor 106 may emit a radio signal, detect an impedance change, detect a capacitance change, and so forth. In still other implementations, a sensor 106 may detect signals emitted by the body of the user 108, such as infrared signals, and the sensor 106 may not necessarily emit a signal. While FIG. 1 depicts a single sensor 106, in other implementations, multiple sensors 106 may be used to acquire one or multiple PPG signals 104, and in some cases one or more other signals. The PPG signal 104 acquired using the sensor 106 may be provided to one or more analysis servers 112 or another type of computing device. While FIG. 1 depicts a single analysis server 112, any number or any type of computing device may be used to perform the functions described herein. Additionally, while FIG. 1 depicts the sensor 106 providing the PPG signal 104 to the analysis server(s) 112, in other implementations, the sensor 106 may be associated with a wearable computing device or other type of computing device that may perform the functions described herein, and use of the analysis server(s) 112 or another separate computing device may be omitted.

A signal processing module 114 associated with the analysis server(s) 112 may process the received PPG signal 104 to determine one or more data points 116. The PPG signal 104 may represent multiple data points 116, each data point 116 corresponding to a particular time at which a value of the PPG signal 104 was acquired. Therefore, each data point 116 may represent at least two values: an acquired value (such as an amplitude of the PPG signal 104), and a time associated with the acquired value. As shown in FIG. 1, in some cases, the PPG signal 104, the data points 116, or both the PPG signal 104 and the data points 116 may be represented as a graph, with each data point 116 positioned relative to a first axis to represent the time associated with the data point 116, and positioned relative to a second axis to represent the value associated with the data point 116. In other cases, other types of data structures, such as tables, lists, and so forth, may be used to represent the data points 116.

A directional module 118 associated with the analysis servers(s) 112 may determine directional components 120 for at least a subset of the data points 116. For a given data point 116, a directional component 120 may indicate a change in the value of the given data point 116 relative to a value of a preceding data point 116. For example, if a given data point 116 has a value that is greater than the value of a previous data point 116 by at least a threshold value, the given data point 116 may be associated with a directional component 120 of "increasing" or "1", or another qualitative or quantitative indication of the change in value associated with the given data point 116. If a given data point 116 has a value that is less than the value of a previous data point 116 by a least a threshold value, the given data point 116 may be associated with a directional component of "decreasing" or "−1", or another qualitative or quantitative indication. If a given data point 116 has a value that is within a threshold value of the value of a previous data point 116, the given data point 116 may be associated with a directional component of "similar", "unchanged", or "0", or another qualitative or quantitative indication. Threshold data 132 may indicate one or more threshold changes in value that may correspond to a directional component 120 of increasing, decreasing, similar, or other directional components 120. A threshold value may include a direct value, such as an indication of a change in amplitude that is regarded as significant. In other cases, a threshold value may include a ratio, percentage, or other type of relative value. For example, a change in value of 10% or more between one data point 116 and a successive data point 116 may be regarded as a significant change, while a change that is less than 10% may not be regarded as a significant change and the directional component 120 for the successive data point 116 may be determined as "similar".

A scoring module 124 associated with the analysis server(s) 112 may determine score data 126 indicative of one or more scores based in part on one or more of the directional components 120 or the values represented by the data points 116. For example, the scoring module 124 may determine a prominence score that represents a likelihood that a given data point 116 is a local maximum (a peak), a local minimum (a valley), or neither a local maximum nor a local minimum. The prominence score may be determined based in part on directional components 120 of sets of data points 116 that precede and follow a given data point 116. For example, if a given data point 116 is preceded by multiple data points 116 that have an "increasing" directional component 120, followed by multiple data points that have a "decreasing" directional component 120, or both preceded by increasing data points 116 and followed by decreasing data points 116, the given data point 116 may be a local maximum. Similarly, if the given data point 116 is preceded by multiple decreasing data points 116, followed by multiple increasing data points 116, or both preceded by decreasing data points 116 and followed by increasing data points 116, the given data point 116 may be a local minimum. In some implementations, a prominence score for a given data point 116 may be determined based at least in part on Equation 1, below:

$$PS[x] = d[x-3] + d[x-2] + d[x-1] + d[x] - d[x+1] - d[x+2] - d[x+3] - d[x+4] \quad \text{(Equation 1)}$$

In Equation 1, "PS[x]" may represent a prominence score for a given data point "x". In Equation 1, "d[x−1]" may represent the directional component of a data point "x−1" that immediately precedes the data point "x", "d[x−2]" may represent the directional component of a data point "x−2" that immediately precedes the data point "x−1", "d[x−3]" may represent the directional component of a data point "x−3" that immediately precedes the data point "x−2", and "d[x−4]" may represent the directional component of a data point "x−4" that immediately precedes the data point "x−3". In Equation 1, "d[x+1]" may represent the directional component of a data point "x+1" that immediately follows the data point "x", "d[x+2]" may represent the directional component of a data point "x+2" that immediately follows the data point "x+1", "d[x+3]" may represent the directional component of a data point "x+3" that immediately follows the data point "x+2", "d[x+4]" may represent the directional component of a data point "x+4" that immediately follows the data point "x+3". To determine a prominence score for a given data point 116, directional components 120 for a first set of data points 116 that precede the given data point 116 and directional components 120 for a second set of data points 116 that follow the given data point 116 may be determined. For example, Equation 1 depicts determining a prominence score for a given data point 116 using directional components 120 for eight data points 116. Each directional component 120 may be assigned a selected value. For example, a directional component 120 indicating that the value of a data point 116 has increased relative to the value of a previous data point 116 may be assigned a value of "1", a directional component 120 indicating that the value of a data point 116 has decreased relative to the value of a previous data point 116 may be assigned a value of "−1", and a directional component 120 indicating that the value of a data point 116 is "similar" to the value of a previous data point 116 within a threshold value may be assigned a value of "0". In such a case, the maximum prominence score for a given data point 116 may be 8, which would occur if the data points "x−3" through "x" each had a directional component of "increasing" and was assigned a value of "1", and each of the data points "x+1" through "x+4" had a directional component of "decreasing" and was assigned a value of −1. Similarly, the minimum prominence score for a given data point 116 may be −8 if each preceding data point has a directional component of "decreasing" and each following data point has a directional component of "increasing". A prominence score that is greater than a first threshold value may indicate a likelihood that a given data point 116 is a local maximum (e.g., a peak), while a prominence score that is less than a second threshold value may indicate a likelihood that the given data point 116 is a local minimum (e.g., a valley). In other implementations, a classifier or other type of machine learning algorithm may be used to classify one or more data points 116 as a local maximum, local minimum, or neither a local maximum nor a local minimum based on the prominence score for a data point 116.

In some implementations, the scoring module 124 may determine a strength score that represents a likelihood that a given data point 116 is a local maximum (a peak), a local minimum (a valley), or neither a local maximum nor a local minimum. The strength score may be determined based in part on values associated with a given data point 116 and one or more other data points 116 that precede or follow the given data point 116. For example, if the value of a given data point 116 is significantly greater than the value of one or more data points 116 that precede or follow the given data point 116, this may indicate a likelihood that the given data point 116 is a local maximum. Conversely, if the value of a given data point 116 is significantly less than the value of one or more data points 116 that precede or follow the given data point 116, this may indicate a likelihood that the given data point 116 is a local minimum. In some implementations, a prominence score for a given data point 116 may be determined based at least in part on Equation 2, below:

$$SS[x] = (V[x] - V[x-4]) + (V[x] - V[x+4]) \quad \text{(Equation 2)}$$

In Equation 2, "SS[x]" may represent a strength score for a given data point "x". In Equation 1, "V[x]" may represent the value of the given data point "x", "V[x−4]" may represent the value of a data point that precedes the given data point 116, and "V[x+4]" may represent the value of a data point that follows the given data point 116. While Equation 2 references data points 116 that are spaced apart from the given data point 116 (e.g., four data points 116 prior to or following the given data point 116), in other implementations, data points 116 having a greater or lesser distance from the given data point 116 may be used. To determine a strength score for the given data point 116, the value for a preceding data point 116 may be subtracted from the value of the given data point 116 to determine a first difference. The value for a following data point 116 may be subtracted from the value of the given data point 116 to determine a second difference. The strength score may be determined based on the sum of the first difference and the second difference. A greater strength score may indicate that the value of the given data point 116 is greater than that of other data points 116 that are close to the given data point 116, and thus the given data point 116 is likely to be a local maximum (e.g., a peak). A lesser strength score may indicate that the value of the given data point 116 is less than that of other data points 116 that are close to the given data point 116, and thus the given data point 116 is likely to be a local minimum (e.g., a valley). Thus, a strength score that is greater than a first threshold value may indicate a likelihood that a given data point 116 is a local maximum, while a strength score that is less than a second threshold value may indicate a likelihood that the given data point 116 is a local minimum. In other implementations, a classifier or other type of machine learning algorithm may be used to classify one or more data points 116 as a local minimum, local maximum, or neither a local minimum nor a local maximum, based at least in part on strength scores associated with the data point(s) 116.

In some implementations, the score data 126 may represent both a prominence score and a strength score for one or more of the data points 116. For example, if a prominence score for a data point 116 is greater than a first threshold value and the strength score for the data point 116 is greater than a second threshold value, this may indicate a likelihood that the data point 116 is a local maximum. If the prominence score for the data point 116 is less than a third threshold value and the strength score for the data point 116 is less than a fourth threshold value, this may indicate a likelihood that the data point 116 is a local minimum. If neither of the described relationships between prominence scores, strength scores, and threshold values occurs, this may indicate that the data point 116 is neither a local maximum nor a local minimum. In other implementations, a classifier or other type of machine learning algorithm may classify data points 116 as local minima, local maxima, or neither local minima nor local maxima based on a combination of prominence scores and strength scores for the data points 116.

A min/max module 128 associated with the analysis server(s) 112 may determine point determinations 130 indicative of whether at least a subset of the data points 116 are local maxima, local minima, or neither a local maximum nor a local minimum, based on a relationship between the score data 126 and threshold data 132, which may represent one or more threshold values for one or more determined scores, or based on an output determined using a classifier or other type of machine learning algorithm. Once particular data points 116 are determined to be local maxima or local minima, the data points 116 may be used to determine various physiological values, or other types of values, associated with the user 108.

An evaluation module 134 associated with the analysis server(s) 112 may determine value data 136 based on one or more of the data points 116, and the point determinations 130 indicative of the particular data points 116 that are local maxima or local minima. Value data 136 may represent one or more physiological values determined based on the data points 116, such as a pulse rate value, oxygen saturation value, respiration rate value, and so forth. One or more evaluation parameters 138 may be used to determine the value data 136 based on the data points 116 and point determinations 130.

For example, each local maximum determined in the PPG signal 104 may correspond to a time when a systolic portion of a heartbeat occurred, while each local minimum may correspond to a time when a diastolic portion of a heartbeat occurred. Based on the length of time between successive local maxima or local minima, a count of local maxima or local minima within a selected period of time, or a count of local maximum and local minimum pairs within a selected period of time, a pulse rate value may be determined. For example, a count of local maxima within a selected period of time may be used to determine a count of heartbeats per minute. In some implementations, the PPG signal 104 may be detrended before determining a pulse rate value or one or more other values. For example, the value of each data point 116 of a PPG signal 104 may increase or decrease based on characteristics of the user 108 other than movement of blood within the body. For example, respiration, motion, ambient light, and noise may cause changes in the value of each data point 116 of the PPG signal 104. Detrending of the PPG signal 104 may facilitate determination of local maxima and local minima and determination of heart rate values and other physiological values.

In some implementations the data points 116 and point determinations 130 may be used to determine an oxygen saturation value associated with the user 108. As described previously, the difference between the value of a data point 116 that is a local maximum and the value of a subsequent data point 116 that is a local minimum may represent an amount of blood moved during a heartbeat represented by the local maximum and local minimum (e.g., a perfusion index). The perfusion index may be determined by dividing the value of an AC component of a PPG signal 104 by the value of a DC component of the PPG signal 104. The AC component may be determined by subtracting the value of the local minimum from the value for the local maximum. The DC component may be the mean of the values for the local maximum and the local minimum. Therefore, the perfusion index for a given pair of data points 116 representing a local maximum and local minimum may be determined based on Equation 3 below:

$$PI=(V[max]-V[min])/\{(V[max]+V[min])/2\} \quad \text{(Equation 3)}$$

In Equation 3, "PI" may represent the perfusion index value for a given local maximum and local minimum pair of data points 116. In Equation 3, "V[max]" represents the value of the data point 116 that is a local maximum, while "V[min]" represents the value of the data point 116 that is a local minimum. While Equation 3 describes determining a perfusion index value for a single pair of data points 116, for a greater portion of the PPG signal 104, an average of multiple perfusion index values for multiple local maximum and local minimum pairs may be used.

An oxygen saturation value may be determined based in part on one or more perfusion index values. Oxygen saturation (SpO2) is a measurement of an amount of oxygen dissolved in blood, which may be determined based on the detection of oxyhemoglobin and deoxyhemoglobin. The amount of light emitted by the sensor 106 that is absorbed by the blood may be affected by the concentrations of oxyhemoglobin and deoxyhemoglobin that are present. Oxyhemoglobin and deoxyhemoglobin absorb different amounts of light at different wavelengths. Therefore, the blood volume variation (perfusion index) measured using different wavelengths of light may be used to determine an oxygen saturation value, as described below in Equation 4:

$$SpO2 = PI@660\ nm / PI@940\ nm \quad \text{(Equation 4)}$$

In Equation 4, "SpO2" represents an oxygen saturation value. In Equation 4, "PI@660 nm" represents the perfusion index, which may be determined based on Equation 3 above, based on light having a wavelength of 660 nm (such as light emitted using a red LED). In Equation 4, "PI@940 nm" represents the perfusion index, based on light having a wavelength of 940 nm (such as light emitted using an infrared LED). A ratio of the two perfusion index values may represent an amount of oxygen present in the blood of the user 108, which may be expressed as an oxygen saturation value.

Because different wavelengths of light interact differently with portions of a user's body, perfusion index values determined using different channels of a signal may be different. For example, green, red, and infrared light emitted by different LEDs may each be used to determine different perfusion index values. An oxygen saturation value may be determined by dividing the perfusion index determined using a first channel, such as a channel corresponding to light having a wavelength of about 660 nanometers (nm) (e.g., red light), by the perfusion index determined using a second channel, such as a channel corresponding to light having a wavelength of about 940 nm (e.g., infrared light). In some implementations, the location of a local minimum or local maximum within a PPG signal 104 may be determined using a first channel of the PPG signal 104, such as light emitted using a green LED, while determination of an oxygen saturation value may be determined using one or more other channels of the PPG signal 104, such as light emitted using red and infrared LEDs. For example, after the location of a local maximum and local minimum are determined using the first channel, a data point 116 at a corresponding location of one or more additional channels may be used to determine perfusion index and oxygen saturation values.

In some implementations, the data points 116 and point determinations 130 may be used to determine a respiration rate value associated with the user 108. As described previously, breath movements of the user 108, such as inhalation and exhalation, may cause the values (e.g., amplitude) of data points 116, including those of local minima and local maxima, to change. Additionally, inhalation and exhalation may cause the perfusion index (e.g., the difference between the value of a local maximum and the value of a subsequent local minimum) to change. Inhalation and exhalation may also cause an interbeat interval (e.g., the distance between adjacent local maxima or local minima) to change. In some cases, the local maxima and local minima or changes in these measurements may be used to determine a respiratory rate value associated with a user 108. For example, local minima and local maxima on a graph that indicates the change in amplitude of a PPG signal 104 over time may correspond to inhalation and exhalation breath movements of the user 108, which may be used to determine a count of breaths during a selected period of time. Similarly, local maxima and local minima within a graph that indicates a change in perfusion index or a change in interbeat intervals over time may also indicate times when inhalation and exhalation breath movements occurred.

An output module 140 associated with the analysis server(s) 112 may determine output data 142 based on at least a portion of the value data 136. The output data 142 may be provided to an output device 110 to cause presentation of an output 102 indicative of one or more values based on the value data 136. For example, the output data 142 may cause presentation of a user interface that includes one or more physiological values, an indication of one or more time periods, additional information regarding particular values, recommended activities based on one or more of the values, and so forth.

Figure 2:
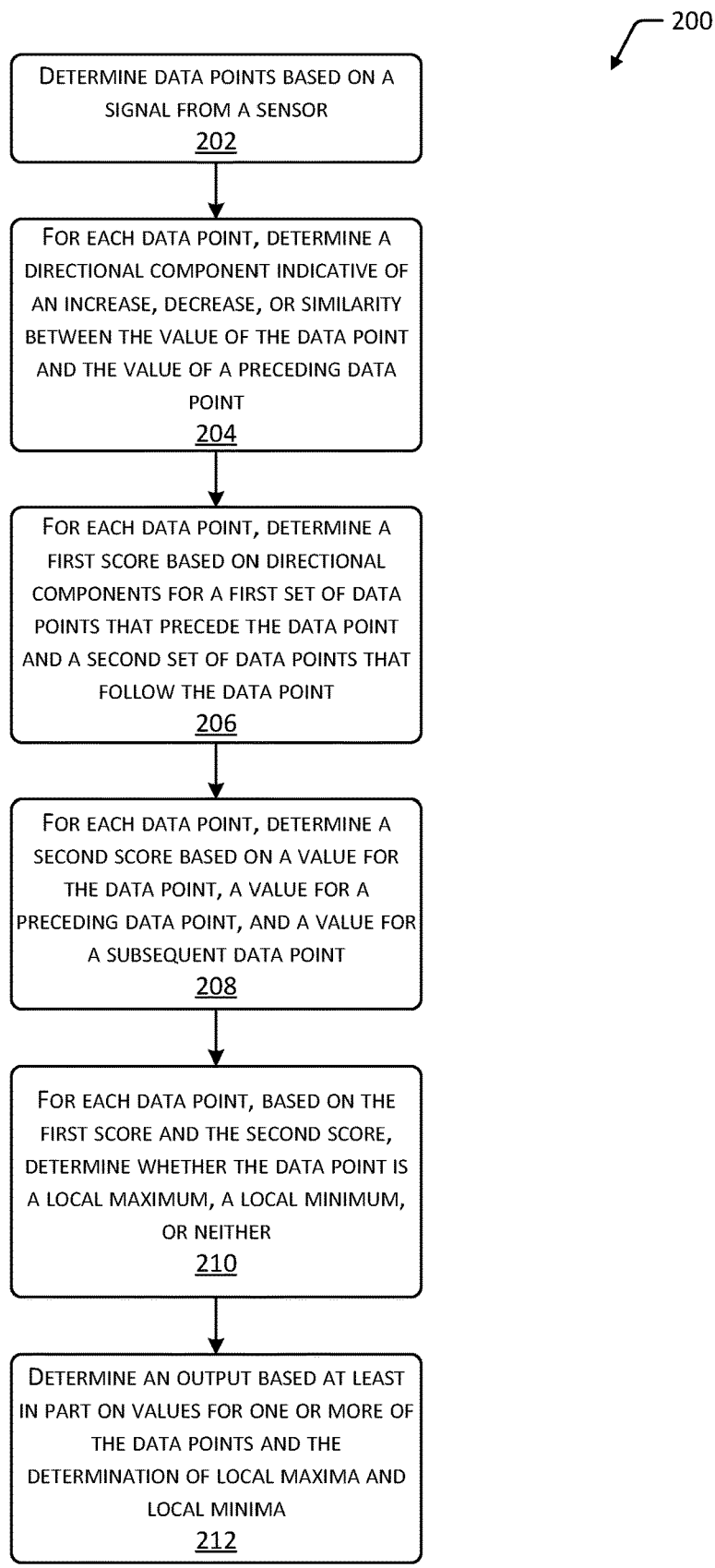
FIG. 2 is a flow diagram depicting an implementation of a method for determining an output based on data points determined from a signal acquired using a sensor.

FIG. 2 is a flow diagram 200 depicting an implementation of a method for determining an output 102 based on data points 116 determined from a signal acquired using a sensor 106. At 202, data points 116 may be determined based on a signal from a sensor 106. For example, a sensor 106 may include a PPG sensor, as described with regard to FIG. 1, or another type of sensor 106 that may acquire one or more other types of signals. The signal acquired from the sensor 106 may include raw signal data, such as an indication of strength, intensity, amplitude, or one or more other values, associated with the time at which the value(s) were acquired, and one or more identifiers indicative of the sensor 106, signal, user 108 or user account, and so forth. As such, each data point 116 may be associated with one or more values, such as an amplitude or other characteristic of the signal, and a time with which the value is associated. Therefore, a set of data points 116 may be represented as a graph or other type of data structure that associates signal amplitude with time. In some implementations, determining data points 116 based on a signal may include detrending the signal, filtering the signal to remove or reduce the effect of noise, and so forth.

At 204, a directional component 120 may be determined for each data point 116. A directional component 120 may include an indication of an increase, a decrease, or a similarity between the value of a given data point 116 and the value of a preceding data point 116. For example, if the value for a given data point 116 is greater than the value for a preceding data point 116 by at least a threshold, the data point 116 may be associated with a directional component 120 of "increasing" or "1". If the value of the data point 116 is less than the value of a preceding data point 116 by at least a threshold, the data point 116 may be associated with a directional component 120 of "decreasing" or "−1". If the value of the data point 116 is neither greater nor less than the value of a preceding data point 116 by at least a threshold value, the data point 116 may be associated with a directional component 120 of "similar" or "0".

At 206, a first score may be determined for each data point 116. The first score may be based on the directional components 120 for a first set of data points 116 that precede a given data point 116, and a second set of data points 116 that follow the given data point 116. For example, as described with regard to FIG. 1 and Equation 1, for a first set of data points 116 (such as a given data point 116 and three data points that precede the given data point 116), values associated with the directional components 120 of the data points 116 may be summed. For a second set of data points 116, such as four data points 116 that follow the given data point 116, values associated with the directional components 120 of the data points may be summed. Subtracting the second sum of values from the first sum of values may be used to determine the first score associated with the data point 116. For example, a prominence score may indicate the likelihood that a particular data point 116 is a local maximum or local minimum based on whether points that precede the particular data point 116 are increasing or decreasing in value, and whether points that follow the particular data point 116 are increasing or decreasing in value.

At 208, a second score may be determined for each data point 116. For example, the second score for a given data point 116 may be based on a value for the given data point 116 relative to the values for one or more data points 116 that precede or follow the given data point 116. Continuing the example, if the value for a given data point 116 is greater than values for data points 116 that precede and follow the given data point 116, this may indicate a likelihood that the given data point 116 is a local maximum, while if the value for a given data point 116 is less than values for data points 116 that precede and follow the given data point 116, this may indicate a likelihood that the given data point 116 is a local minimum. In one implementation, as described with regard to Equation 2, the second score for a given data point 116 may be determined based on a first difference between the value for the given data point 116 and the value for a data point 116 that precedes the given data point 116 by four data points 116, and a second difference between the value for the given data point 116 and the value for a data point 116 that follows the given data point 116 by four data points 116.

At 210, for each data point 116, based on the determined first score and second score, a determination may be made regarding whether the given data point 116 is a local maximum, a local minimum, or neither a local maximum nor a local minimum. In some implementations, a relationship between the first score, the second score, and one or more threshold values may be determined. These relationships may indicate whether a given data point 116 is a local maximum, a local minimum, or neither a local maximum nor local minimum. For example, for a given data point 116, if the prominence score is greater than a first threshold and the strength score is greater than a second threshold, this may indicate that the given data point 116 is a local maximum. If the prominence score is less than a third threshold and the strength score is less than a fourth threshold, this may indicate that the given data point 116 is a local minimum. If neither of these sets of conditions is met, this may indicate that the given data point 116 is neither a local maximum nor a local minimum. In other implementations, a classifier or other type of machine learning algorithm may be used to classify one or more data points 116 as local minima, local maxima, or neither local minima nor local maxima based on combinations of strength scores and prominence scores for the data points 116.

At 212, an output 102 may be determined based in part on values for one or more data points 116 and the determination of local maxima and local minima. For example, as described above with regard to FIG. 1, physiological values, such as a pulse rate value, oxygen saturation value, respiration rate value, or one or more other values may be determined based on distances between local maxima or local minima, differences between values of local maxima and local minima, and so forth. Values for inclusion in an output 102 may be determined based in part on values of data points 116 themselves, as well as determinations regarding particular data points 116 that are local maxima or local minima.

Figure 3A:
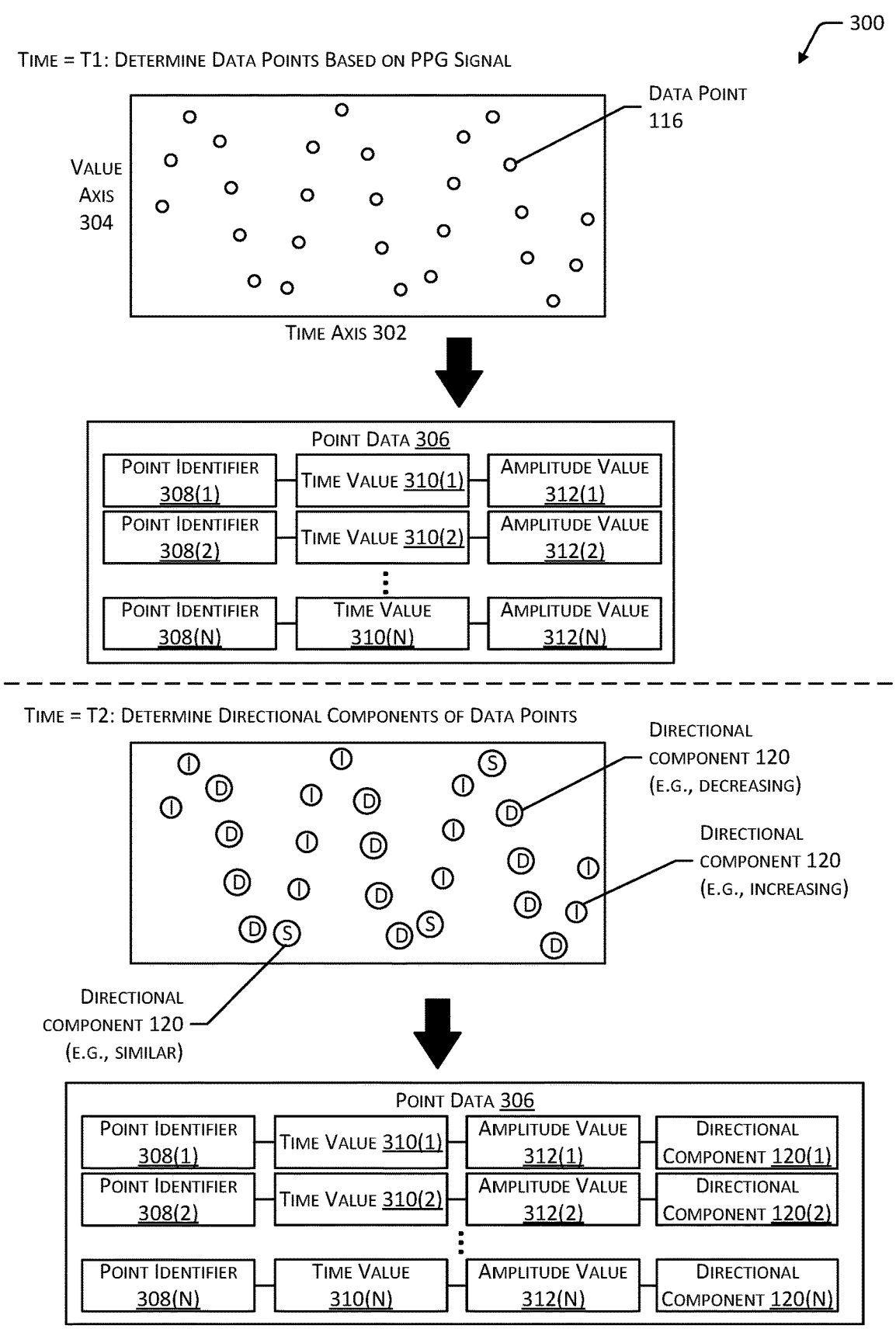
FIGS. 3A-3C are diagrams depicting an implementation of a process for determining scores and other data based on data points determined from a photoplethysmography signal, and physiological values based on the data points.
Figure 3B:
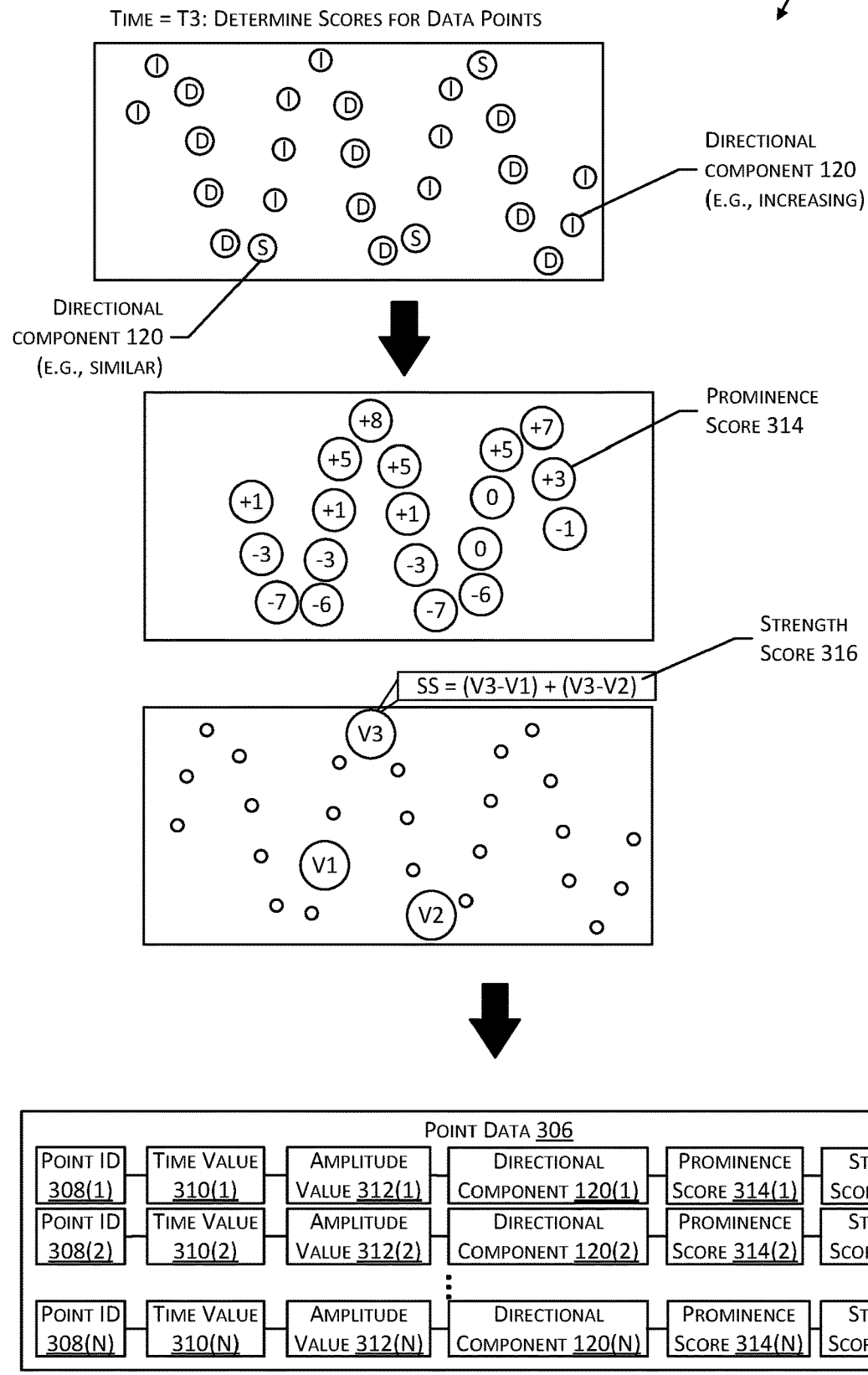
Figure 3C:
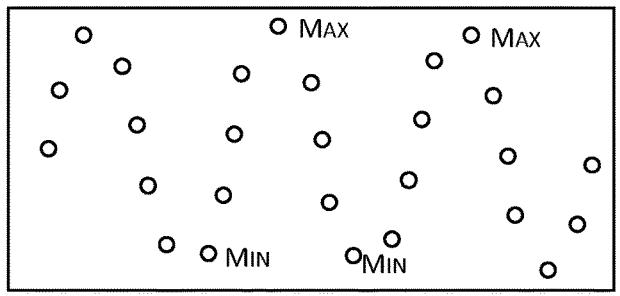
Figure 3C:
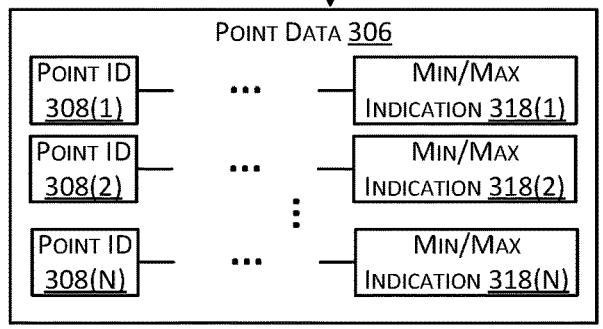
Figure 3C:
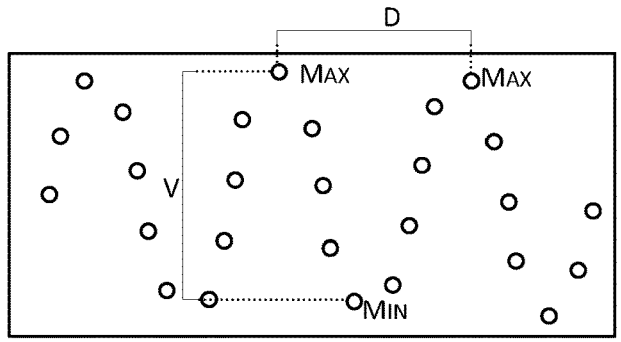

FIGS. 3A-3C are diagrams 300 depicting an implementation of a process for determining scores and other data based on data points 116 determined from a photoplethysmography signal 104, and physiological values based on the data points 116. At a first time T1, data points 116 may be determined based on a PPG signal 104. For example, a PPG signal 104 may be acquired using one or more sensors 106. The PPG signal 104 may be represented by a plurality of data points 116, each data point 116 being associated with a particular time and one or more values. Values associated with a data point 116 may be represented by an amplitude of the PPG signal 104. For example, FIG. 3A depicts the PPG signal 104 represented as a graph in which each data point 116 is associated with a time indicated by a position of the data point 116 along a time axis 302, and each data point 116 is associated with a value indicated by a position of the data point 116 along a value axis 304. A signal processing module 114 or other module associated with an analysis server 112, or other computing device that receives the PPG signal 104, may determine point data 306 based on or representative of at least a subset of the data points 116. For example, the point data 306 may associate a point identifier 308 indicative of a particular data point 116 with a time value 310 indicative of a time associated with acquisition of data associated with the data point 116, and an amplitude value 312 indicative of an amplitude associated with the data point 116. Each data point 116 may be associated with a particular point identifier 308, such as a name, numeral, string, or other data that may be used to differentiate the particular data point 116 from other data points 116, and data indicative of the time and value represented by the data point 116. Continuing the example, FIG. 3A depicts a first point identifier 308(1) representing a first data point 116, that is associated with a first time value 310(1) and first amplitude value 312(1), a second point identifier 308(2) associated with a second time value 310(2) and second amplitude value 312(2), and any number of additional point identifiers 308(N) associated with additional corresponding time values 310(N) and amplitude values 312(N).

At a second time T2, directional components 120 may be determined for at least a subset of the data points 116. As described with regard to FIGS. 1 and 2, a directional component 120 may indicate whether the value associated with a particular data point 116 has increased or decreased by at least a threshold value relative to the value of a preceding data point 116. For example, FIG. 3A depicts each data point 116 associated with a directional component 120 of increasing ("I"), decreasing ("D"), or similar ("S"), indicating a change in the value associated with the data point 116 relative to the value of the preceding data point 116. In some implementations, the point data 306 may include an indication of the determined directional component 120 for each data point 116. For example, FIG. 3A depicts the point data 306 including a first directional component 120(1) associated with the first point identifier 308(1), a second directional component 120(2) associated with the second point identifier 308(2), and any number of additional directional components 120(N) associated with corresponding additional point identifiers 308(N).

As shown in FIG. 3B, at a third time T3, one or more scores may be determined for at least a subset of the data points 116 based at least in part on the determined directional components 120. For example, as described with regard to FIGS. 1 and 2, a prominence score 314 for a particular data point 116 may be determined based on directional components 120 for a first set of data points 116 that precede the particular data point 116 and directional components 120 for a second set of data points 116 that follow the particular data point 116. For example, Equation 1, above, describes one possible implementation for determining a prominence score 314 for a data point 116 based on directional components 120 of sets of data points 116 that precede and follow the data point 116. Continuing the example, a set of eight data points 116 may be examined to determine a prominence score 314 for a particular data point 116 within the set of eight data points 116. Directional components 120 that indicate that a data point 116 is increasing in value may be assigned a first value. Directional components 120 that indicate that a data point 116 is decreasing in value may be assigned a second value having a direction that is opposite that of the first value. For example, the first value may be "1" and the second value may be "−1". In other cases, the first and second values may have different magnitudes. The values assigned to directional components 120 of the particular data point 116 and three data points 116 that precede the particular data point 116 may be added to determine a first sum. The values assigned to directional components 120 for four data points 116 that follow the particular data point 116 may be added to determine a second sum. The second sum may be subtracted from the first sum to determine the prominence score 314 for the particular data point 116. In other implementations, other numbers of data points 116 greater than or less than eight data points 116 may be used to determine a prominence score 314.

Additionally, as shown in FIG. 3B, a strength score 316 may be determined for at least a subset of the data points 116. The strength score 316 for a particular data point 116 may be based on the value for the particular data point 116 and the values for one or more data points 116 that precede or follow the particular data point 116. For example, the value for a data point 116 that precedes a given data point 116 may be subtracted from the value for the given data point 116 to determine a first difference (V3−V1). The value for a data point 116 that follows the given data point 116 may be subtracted from the value for the given data point 116 to determine a second difference (V3−V2). As described with regard to Equation 2 above, the sum of the first difference and the second difference may be used to determine a strength score 316 for the given data point 116.

In some implementations, an indication of one or more of a prominence score 314 or a strength score 316 may be included in the point data 306 indicative of one or more data points 116. For example, FIG. 3B depicts the point data 306 associating a first prominence score 314(1) and first strength score 316(1) with the first point identifier 308(1), a second prominence score 314(2) and second strength score 316(2) with the second point identifier 308(2), and any number of additional prominence scores 314(N) and strength scores 316(N) with any number of corresponding point identifiers 308(N).

As shown in FIG. 3C, at a fourth time T4, data points 116 that constitute local maxima and local minima may be determined based on the prominence scores 314 or strength scores 316. For example, as described with regard to FIGS. 1 and 2, in some implementations, for a given data point 116, if the corresponding prominence score 314 is greater than a first threshold value and the corresponding strength score 316 is greater than a second threshold value, this may indicate that the given data point 116 is a local maximum. If the prominence score 314 is less than a third threshold value and the strength score 316 is less than a fourth threshold value, this may indicate that the given data point 116 is a local minimum. If neither of these sets of conditions is met, this may indicate that the given data point 116 is neither a local maximum nor a local minimum. In other implementations, a classifier or other type of machine learning algorithm may be used to classify one or more data points 116 as local minimal, local maxima, or neither local minima nor local maxima based on determined prominence scores 314 and strength scores 316. In some implementations, a Min/Max indication 318 indicative of the status of a data point 116 as a local maximum, a local minimum, or neither a local maximum nor local minimum, may be indicated in the point data 306. For example, FIG. 3C depicts the point data 306 associating a first min/max indication 318(1) with the first point identifier 308(1), a second min/max indication 318(2) with the second point identifier 308(2), and any number of additional min/max indications 318(N) with any number of corresponding point identifiers 308(N).

At a fifth time T5, physiological values may be determined based at least in part on the determined local maxima and local minima. For example, a heart rate value may be determined based in part on a distance (D) between adjacent local maxima or local minima, which may be used to determine a count of heart movements that occur within a selected time period. As another example, an oxygen saturation value may be determined based in part on a difference (V) between the value for a local maximum and a subsequent local minimum, which may represent a quantity of blood that was moved during an associated heart movement. Continuing the example, a perfusion index may be calculated based on the values for a local maximum and local minimum, and an oxygen saturation value may be determined based on the perfusion index values for different channels of a signal, as illustrated in Equation 3 and Equation 4 above. As yet another example, a respiration rate value may be determined based in part on changes in the amplitude of a signal, changes in perfusion index values between local maxima and subsequent local minima, changes in interbeat intervals between adjacent local maxima or local minima, and so forth. An output 102 may be presented indicative of at least a portion of the values determined based on the data points 116.

Figure 4:
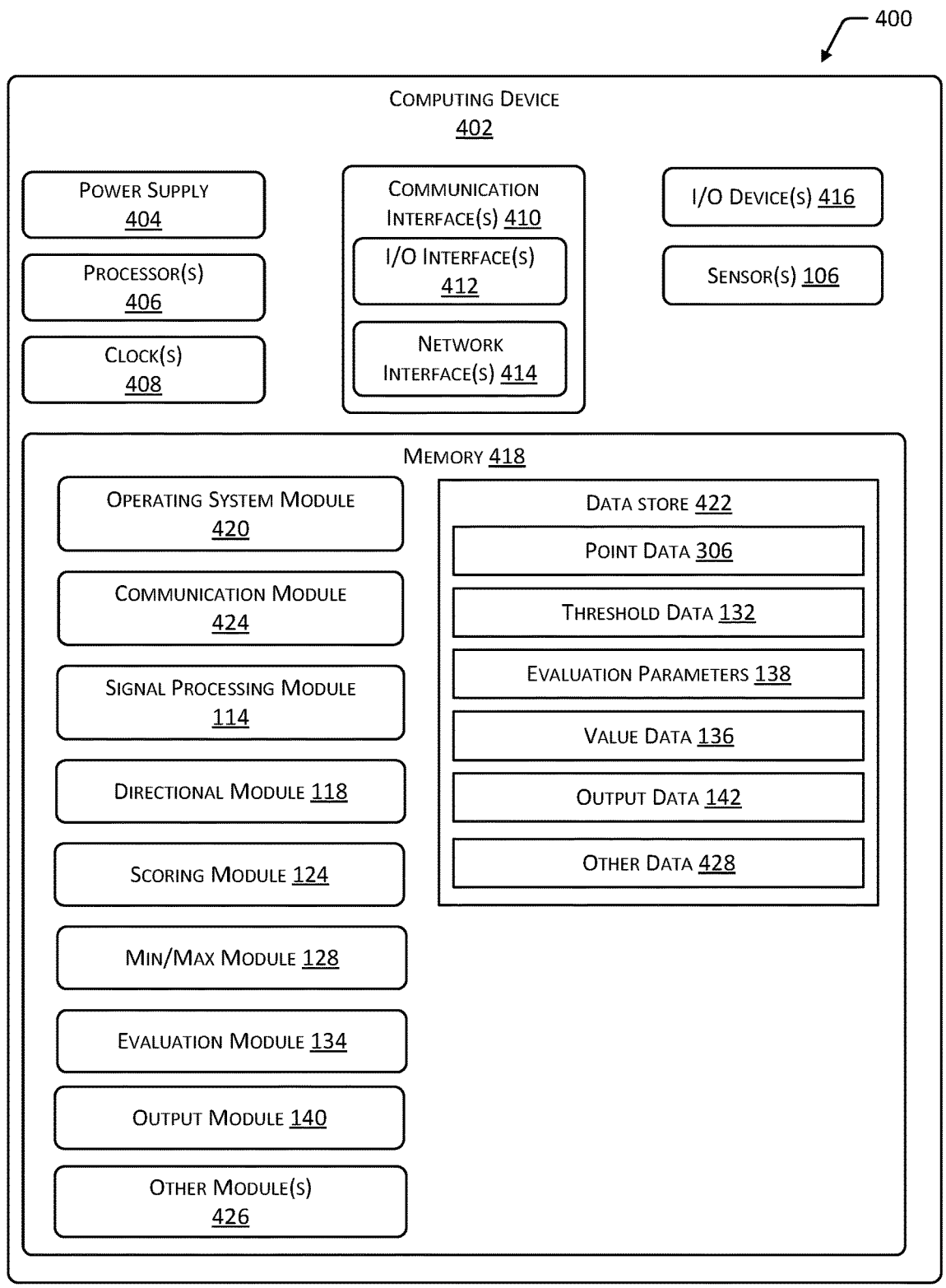
FIG. 4 is a block diagram depicting an implementation of a computing device within the present disclosure.

FIG. 4 is a block diagram 400 depicting an implementation of a computing device 402 within the present disclosure. In some implementations, the computing device 402 may include one or more analysis servers 112 or other types of computing devices 402 associated with processing signals from sensors 106 and determining output 102 based on the signals. In other implementations, the computing devices 402 may include user devices associated with one or more sensors 106 or output devices 110, and use of a separate server or other type of computing device 402 may be omitted. In other cases, combinations of servers and user devices may be used to perform the functions described here. Therefore, while FIG. 4 depicts a single block diagram 400 of a computing device 402, any number and any type of computing devices 402 may be used to perform the functions described herein.

One or more power supplies 404 may be configured to provide electrical power suitable for operating the components of the computing device 402. In some implementations, the power supply 404 may include a rechargeable battery, fuel cell, photovoltaic cell, power conditioning circuitry, and so forth.

The computing device 402 may include one or more hardware processor(s) 406 (processors) configured to execute one or more stored instructions. The processor(s) 406 may include one or more cores. One or more clock(s) 408 may provide information indicative of date, time, ticks, and so forth. For example, the processor(s) 406 may use data from the clock 408 to generate a timestamp, trigger a preprogrammed action, and so forth.

The computing device 402 may include one or more communication interfaces 410, such as input/output (I/O) interfaces 412, network interfaces 414, and so forth. The communication interfaces 410 may enable the computing device 402, or components of the computing device 402, to communicate with other computing devices 402 or components of the other computing devices 402. The I/O interfaces 412 may include interfaces such as Inter-Integrated Circuit (I2C), Serial Peripheral Interface bus (SPI), Universal Serial Bus (USB) as promulgated by the USB Implementers Forum, RS-232, and so forth.

The I/O interface(s) 412 may couple to one or more I/O devices 416. The I/O devices 416 may include any manner of input devices or output devices associated with the computing device 402. For example, I/O devices 416 may include touch sensors, displays, touch sensors integrated with displays (e.g., touchscreen displays), keyboards, mouse devices, microphones, image sensors, cameras, scanners, speakers or other types of audio output devices, haptic devices, printers, and so forth. In some implementations, the I/O devices 416 may be physically incorporated with the computing device 402. In other implementations, I/O devices 416 may be externally placed.

The computing device 402 may also include one or more sensors 106, such as PPG sensors for determining a PPG signal 104 that may be used to determine heart rate values, oxygen saturation values, respiration rate values, or other physiological values associated with a user 108. Other types of sensors 106 may include physiological sensors, such as blood pressure sensors, heart rate monitors, temperature sensors, breath monitors, and so forth. Sensors 106 may also include accelerometers, gyroscopes, magnetometers, location sensors, motion sensors, proximity sensors, image sensors, and so forth, which may be used to determine movement and positions of a user 108 during acquisition of signals.

The network interfaces 414 may be configured to provide communications between the computing device 402 and other devices, such as the I/O devices 416, routers, access points, and so forth. The network interfaces 414 may include devices configured to couple to one or more networks including local area networks (LANs), wireless LANs (WLANs), wide area networks (WANs), wireless WANs, and so forth. For example, the network interfaces 514 may include devices compatible with Ethernet, Wi-Fi, Bluetooth, ZigBee, Z-Wave, 3G, 4G, 5G, LTE, and so forth.

The computing device 402 may include one or more buses or other internal communications hardware or software that allows for the transfer of data between the various modules and components of the computing device 402.

As shown in FIG. 4, the computing device 402 may include one or more memories 418. The memory 418 may include one or more computer-readable storage media (CRSM). The CRSM may be any one or more of an electronic storage medium, a magnetic storage medium, an optical storage medium, a quantum storage medium, a mechanical computer storage medium, and so forth. The memory 418 may provide storage of computer-readable instructions, data structures, program modules, and other data for the operation of the computing device 402. A few example modules are shown stored in the memory 418, although the same functionality may alternatively be implemented in hardware, firmware, or as a system on a chip (SoC).

The memory 418 may include one or more operating system (OS) modules 420. The OS module 420 may be configured to manage hardware resource devices such as the I/O interfaces 412, the network interfaces 414, the I/O devices 416, and to provide various services to applications or modules executing on the processors 406. The OS module 420 may implement a variant of the FreeBSD operating system as promulgated by the FreeBSD Project; UNIX or a UNIX-like operating system; a variation of the Linux operating system as promulgated by Linus Torvalds; the Windows operating system from Microsoft Corporation of Redmond, Washington, USA; or other operating systems.

One or more data stores 422 and one or more of the following modules may also be associated with the memory 418. The modules may be executed as foreground applications, background tasks, daemons, and so forth. The data store(s) 422 may use a flat file, database, linked list, tree, executable code, script, or other data structure to store information. In some implementations, the data store(s) 422 or a portion of the data store(s) 422 may be distributed across one or more other devices including other computing devices 402, network attached storage devices, and so forth.

A communication module 424 may be configured to establish communications with one or more other computing devices 402. Communications may be authenticated, encrypted, and so forth.

The memory 418 may also store the signal processing module 114. The signal processing module 114 may determine data points 116 based on a received PPG signal 104 or other type of signal. For example, a signal may represent multiple data points 116, each data point 116 corresponding to a particular time at which a value of the signal was acquired. The signal processing module 114 may determine point data 306 based on a received signal. For example, point data 306 may associate a time associated with a particular data point 116 with a value for the data point 116.

The memory 418 may additionally store the directional module 118. The directional module 118 may determine directional components 120 for at least a subset of determined data points 116. For a given data point 116, a directional component 120 may indicate a change in the value of the given data point 116 relative to a value of a preceding data point 116. For example, if a given data point 116 has a value that is greater than the value of a previous data point 116 by at least a threshold value, the given data point 116 may be associated with a directional component 120 of "increasing" or "1", or another qualitative or quantitative indication of the change in value associated with the given data point 116. If a given data point 116 has a value that is less than the value of a previous data point 116 by a least a threshold value, the given data point 116 may be associated with a directional component of "decreasing" or "−1", or another qualitative or quantitative indication. If a given data point 116 has a value that is within a threshold value of the value of a previous data point 116, the given data point 116 may be associated with a directional component of "similar", "unchanged", or "0", or another qualitative or quantitative indication. In some implementations, the directional module 118 may access threshold data 132, which may indicate one or more threshold values that may correspond to a directional component 120 of increasing, decreasing, similar, or other directional components 120. A threshold value may include a direct value, such as an indication of a change in amplitude that is regarded as significant. In other cases, a threshold value may include a ratio, percentage, or other type of relative value, such as a change of 10% or more between successive data points 116.

The memory 418 may store the scoring module 124. The scoring module 124 may determine score data 126 indicative of one or more scores based in part on one or more of the directional components 120 or the values represented by the data points 116. For example, the scoring module 124 may determine a prominence score 314, strength score 316, or both a prominence score 314 and strength score 316 for at least a subset of the data points 116. The determined scores may represent a likelihood that a given data point 116 is a local maximum (a peak), a local minimum (a valley), or neither a local maximum nor a local minimum. Prominence scores 314 may be determined based in part on directional components 120 of sets of data points 116 that precede and follow a given data point 116. For example, if a given data point 116 is preceded by multiple data points 116 that have an "increasing" directional component 120, followed by multiple data points that have a "decreasing" directional component 120, or both preceded by increasing data points 116 and followed by decreasing data points 116, the given data point 116 may be a local maximum. A strength score 316 may also represent a likelihood that a given data point 116 is a local maximum, a local minimum, or neither a local maximum nor a local minimum. The strength score 316 may be determined based in part on values associated with a given data point 116 and one or more other data points 116 that precede or follow the given data point 116. For example, the value for a preceding data point 116 may be subtracted from the value of the given data point 116 to determine a first difference. The value for a following data point 116 may be subtracted from the value of the given data point 116 to determine a second difference. The strength score 316 may be determined based on the first difference and the second difference.

The memory 418 may also store the min/max module 128. The min/max module 128 may determine point determinations 130 indicative of whether at least a subset of the data points 116 are local maxima, local minima, or neither a local maximum nor a local minimum, based on a relationship between the score data 126 and threshold data 132, or through use of a classifier or other type of machine learning algorithm. Once particular data points 116 are determined to be local maxima or local minima, the data points 116 may be used to determine various physiological values, or other types of values, associated with the user 108.

The memory 418 may additionally store the evaluation module 134. The evaluation module 134 may determine value data 136 based on one or more of the data points 116, and the point determinations 130 indicative of the particular data points 116 that are local maxima or local minima. Value data 136 may represent one or more physiological values determined based on the data points 116, such as a pulse rate value, oxygen saturation value, respiration rate value, and so forth. In some implementations, the evaluation module 134 may access one or more evaluation parameters 138, which may be used to determine the value data 136 based on the data points 116 and point determinations 130.

The memory 418 may store the output module 140. The output module 140 may determine output data 142 based on at least a portion of the value data 136. Output data 142 may be provided to an output device 110 to cause presentation of an output 102, such as a user interface or other type of data indicative of one or more values based on the value data 136.

Other modules 426 may also be present in the memory 418. For example, other modules 426 may include permission or authorization modules to enable users to access and modify data associated with the computing device 402. Other modules 426 may include permission modules to enable a user 108 to opt in or otherwise provide authorization for data associated with a sensor 106 to be acquired, sent to other computing devices 402, and so forth. Other modules 426 may also include encryption modules to encrypt and decrypt communications between computing devices 402, authentication modules to authenticate communications sent or received by computing devices 402, user interface modules to generate interfaces for receiving input from users 108, and so forth.

Other data 428 within the data store(s) 422 may include configurations, settings, preferences, and default values associated with computing devices 402. Other data 428 may also include encryption keys and schema, access credentials, and so forth.

In different implementations, different computing devices 402 may have different capabilities or capacities. For example, analysis servers 112 may have greater processing capabilities or data storage capacity than user devices associated with sensors 106 or output devices 110.

The processes discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described in this disclosure. The computer-readable storage medium may be one or more of an electronic storage medium, a magnetic storage medium, an optical storage medium, a quantum storage medium, and so forth. For example, the computer-readable storage media may include, but is not limited to, hard drives, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

What is claimed is:

1. A system comprising:
one or more memories storing computer-executable instructions; and
one or more hardware processors to execute the computer-executable instructions to:
determine, based on a photoplethysmogram (PPG) signal from a sensor, a plurality of data points that include a first data point, a second data point subsequent to the first data point, and a third data point subsequent to the second data point;
determine, for each data point of the plurality of data points, a directional component indicative of an increase, a decrease, or a similarity between a first value for each data point and a second value for a preceding data point that precedes each data point;
determine a first prominence score for the first data point based on:
first directional components for a first set of data points that precede the first data point; and
second directional components for a second set of data points that follow the first data point;
determine a first strength score for the first data point based on: a third value for the first data point, a fourth value for an initial data point of the first set of data points, and a fifth value for a terminal data point of the second set of data points;
determine first correspondence between the first prominence score and a first threshold score;
determine second correspondence between the first strength score and a second threshold score;
based on the first correspondence and the second correspondence, determine that the first prominence score is greater than the first threshold score and the first strength score is greater than the second threshold score;
determine a second prominence score for the second data point based on:
third directional components for a third set of data points that precede the second data point; and
fourth directional components for a fourth set of data points that follow the second data point;
determine a second strength score for the second data point based on: a sixth value for the second data point, a seventh value for an initial data point of the third set of data points, and an eighth value for a terminal data point of the fourth set of data points;
determine third correspondence between the second prominence score and a third threshold score;
determine fourth correspondence between the second strength score and a fourth threshold score;
based on the third correspondence and the fourth correspondence, determine that the second prominence score is less than the third threshold score and the second strength score is less than the fourth threshold score;
determine a third prominence score for the third data point based on:
fifth directional components for a fifth set of data points that precede the third data point; and
sixth directional components for a sixth set of data points that follow the third data point;
determine a third strength score for the third data point based on: a ninth value for the third data point, a tenth value for an initial data point of the fifth set of data points, and an eleventh value for a terminal data point of the sixth set of data points;
determine fifth correspondence between the third prominence score and the first threshold score;
determine sixth correspondence between the third strength score and the second threshold score;
based on the fifth correspondence and the sixth correspondence, determine that the third prominence score is greater than the first threshold score and the third strength score is greater than the second threshold score;
based on the first prominence score and the third prominence score being greater than the first threshold score and the first strength score, and based on the third strength score being greater than the second threshold score, determine a period of time between a first time associated with the first data point and a second time associated with the third data point;
determine a pulse rate value based at least in part on the period of time;
determine output indicative of the pulse rate value; and
provide data indicative of the output to an output device for presentation of the output indicative of the pulse rate value in a user interface.

2. The system of claim 1, further comprising computer-executable instructions to:
determine, based on the third value for the first data point and the sixth value for the second data point, a first perfusion index value for a first channel of the PPG signal associated with a first wavelength of light and a second perfusion index value for a second channel of the PPG signal associated with a second wavelength of light; and
determine an oxygen saturation value based on a ratio of the first perfusion index value to the second perfusion index value.

3. The system of claim 1, further comprising computer-executable instructions to:
determine a fourth data point associated with a fourth prominence score that is less than the third threshold score and a fourth strength score that is less than the fourth threshold score;
determine a fifth data point associated with a fifth prominence score that is greater than the first threshold score and a fifth strength score that is greater than the second threshold score;
determine a first difference between the third value for the first data point and the sixth value for the second data point;
determine a second difference between the ninth value for the third data point and a twelfth value for the fourth data point;
determine a third difference between the first difference and the second difference;

determine a first distance between the first data point and the third data point;
determine a second distance between the third data point and the fifth data point;
determine a fourth difference between the first distance and the second distance; and
determine a respiration rate value based at least in part on the third difference and the fourth difference.

4. A method comprising:
determining a plurality of data points based on a signal;
determining, for a first data point of the plurality of data points:
  first directional components for a first set of data points that precede the first data point, wherein each first directional component is indicative of a change in a value for a particular data point of the first set relative to a value for a preceding data point of the first set that precedes the particular data point;
  second directional components for a second set of data points that follow the first data point, wherein each second directional component is indicative of a change in a value for a particular data point of the second set relative to a value for a preceding data point of the second set; and
  a first score for the first data point based on the first directional components and the second directional components;
determining, based on a first relationship between the first score and one or more first threshold values, that the first data point comprises one of: a local maximum or a local minimum;
determining, for a second data point of the plurality of data points:
  third directional components for a third set of data points that precede the second data point, wherein each third directional component is indicative of a change in a value for a particular data point of the third set relative to a value for a preceding data point of the third set;
  fourth directional components for a fourth set of data points that follow the second data point, wherein each fourth directional component is indicative of a change in a value for a particular data point of the fourth set relative to a value for a preceding data point of the fourth set; and
  a second score for the second data point based on the third directional components and the fourth directional components;
determining, based on a second relationship between the second score and the one or more first threshold values, that the second data point comprises one of:
  the one of the local maximum or the local minimum; or
  the other of the local maximum or the local minimum;
based on the first data point comprising the one of the local maximum or the local minimum and the second data point comprising the one of the local maximum or the local minimum or the other of the local maximum or the local minimum, determining an output based on a first value associated with the first data point and a second value associated with the second data point; and
providing data indicative of the output to an output device for presentation of the output in a user interface.

5. The method of claim 4, further comprising:
determining a third value of at least one data point of the first set of data points;
determining a fourth value of at least one data point of the second set of data points;
determining, for the first data point, a third score based on: a third relationship between the first value and the third value, and a fourth relationship between the first value and the fourth value; and
determining a fifth relationship between the third score and one or more second threshold values, wherein the first data point is determined to comprise the one of the local maximum or the local minimum further based on the fifth relationship.

6. The method of claim 4, further comprising:
determining, based on the second relationship between the second score and the one or more first threshold values, that the second data point comprises the one of the local maximum or the local minimum;
based on the first data point and the second data point comprising the one of the local maximum or the local minimum, determining a first time associated with the first data point and a second time associated with the second data point; and
determining a pulse rate value based at least in part on the first time and the second time, wherein the output is indicative of the pulse rate value.

7. The method of claim 4, further comprising:
determining, based on the second relationship between the second score and the one or more first threshold values, that the second data point comprises the one of the local maximum or the local minimum;
determining a lack of a data point comprising the other of the local maximum or the local minimum between the first data point and the second data point; and
based on the lack of the data point comprising the other of the local maximum or the local minimum, determining that the first value associated with the first data point is greater than the second value associated with the second data point, wherein the output is based on the first value in response to the first value being greater than the second value.

8. The method of claim 4, further comprising:
determining, based on the second relationship between the second score and the one or more first threshold values, that the second data point comprises the other of the local maximum or the local minimum;
based on the first data point comprising the one of the local maximum or the local minimum and the second data point comprising the other of the local maximum or the local minimum, determining a third relationship between the first value associated with the first data point and the second value associated with the second data point; and
determining an oxygen saturation value based in part on the third relationship, wherein the output is indicative of the oxygen saturation value.

9. The method of claim 8, wherein the first value and the second value are associated with a first channel of the signal, the method further comprising:
determining a third value for the first data point and a fourth value for the second data point based on a second channel of the signal;
determining a fourth relationship between the third value and the fourth value; and
determining a ratio of the third relationship to the fourth relationship, wherein the oxygen saturation value is further based in part on the ratio.

10. The method of claim 4, wherein a first location of the first data point within the signal is determined based on a first channel of the signal, the method further comprising:

determining the first value for the first data point based on a second location within a second channel of the signal that corresponds to the first location.

11. The method of claim 4, further comprising:
determining, based on the second relationship between the second score and the one or more first threshold values, that the second data point comprises the other of the local maximum or the local minimum;
determining, for a third data point of the plurality of data points:
  fifth directional components for a fifth set of data points that precede the third data point, wherein each fifth directional component is indicative of a change in a value for a particular data point of the fifth set relative to a value for a preceding data point of the fifth set;
  sixth directional components for a sixth set of data points that follow the third data point, wherein each sixth directional component is indicative of a change in a value for a particular data point of the sixth set relative to a value for a preceding data point of the sixth set; and
  a third score for the third data point based on the fifth directional components and the sixth directional components; and
determining, based on a third relationship between the third score and the one or more first threshold values, that the third data point comprises the one of the local maximum or the local minimum;
wherein the output is further based on a third value associated with the third data point.

12. The method of claim 11, further comprising:
determining a fourth data point of the plurality of data points, wherein the fourth data point comprises the one of the local maximum or the local minimum;
determining a first distance between the first data point and the third data point;
determining a second distance between the third data point and the fourth data point; and
determining a respiration rate value based at least in part on a difference between the first distance and the second distance.

13. A system comprising:
one or more memories storing computer-executable instructions; and
one or more hardware processors to execute the computer-executable instructions to:
  determine a plurality of data points based on a signal;
  determine, a first value for a first data point of the plurality of data points;
  determine a second value for a second data point that precedes the first data point;
  determine a third value for a third data point that follows the first data point;
  determine a first difference between the first value and the second value;
  determine a second difference between the first value and the third value;
  determine a first score for the first data point based on the first difference and the second difference;
  determine, based on a first relationship between the first score and one or more first threshold values, that the first data point comprises one of: a local maximum or a local minimum;
  determine a fourth value for a fourth data point that precedes the third data point and follows the first data point;
  determine a fifth value for a fifth data point that follows the third data point;
  determine a third difference between the second value and the fourth value;
  determine a fourth difference between the second value and the fifth value;
  determine a second score for the third data point based on the third difference and the fourth difference;
  determine, based on a second relationship between the second score and the one or more first threshold values, that the third data point comprises one of:
    the one of the local maximum or the local minimum; or
    the other of the local maximum or the local minimum;
  based on the first data point comprising the one of the local maximum or the local minimum and the second data point comprising the one of the local maximum or the local minimum or the other of the local maximum or the local minimum, determine an output based on the first value and the third value; and
  provide data indicative of the output to an output device for presentation of the output in a user interface.

14. The system of claim 13, further comprising computer-executable instructions to:
determine first directional components for a first set of data points that precede the first data point and include the second data point, wherein each first directional component is indicative of a change in a value for a particular data point of the first set relative to a value for a preceding data point of the first set;
determine second directional components for a second set of data points that follow the first data point and include the third data point, wherein each second directional component is indicative of a change in a value for a particular data point of the second set relative to a value for a preceding data point of the second set;
determine a third score for the first data point based on the first directional components and the second directional components; and
determine a third relationship between the third score and one or more second threshold values, wherein the first data point is determined to comprise the one of the local maximum or the local minimum further based on the third relationship.

15. The system of claim 13, further comprising computer-executable instructions to:
determine, based on the second relationship between the second score and the one or more first threshold values, that the third data point comprises the one of the local maximum or the local minimum; and
based on the first data point and the third data point comprising the one of the local maximum or the local minimum, determine a pulse rate value based at least in part on a distance between the first data point and the third data point.

16. The system of claim 13, further comprising computer-executable instructions to:
determine a lack of a data point comprising the other of the local maximum or the local minimum between the first data point and the third data point; and
based on the lack of the data point comprising the other of the local maximum or the local minimum, determine that the first value associated with the first data point is greater than the third value associated with the third data point, wherein the output is based on the first value in response to the first value being greater than the third value.

17. The system of claim 13, further comprising computer-executable instructions to:
  determine, based on the second relationship between the second score and the one or more first threshold values, that the third data point comprises the other of the local maximum or the local minimum; and
  based on the first data point comprising the one of the local maximum or the local minimum and the third data point comprising the other of the local maximum or the local minimum, determine a third relationship between the first value associated with the first data point and the third value associated with the third data point; and
  determine an oxygen saturation value based in part on the third relationship, wherein the output is indicative of the oxygen saturation value.

18. The system of claim 17, wherein the first value and the third value are associated with a first channel of the signal, the system further comprising computer-executable instructions to:
  determine a sixth value for the first data point and a seventh value for the third data point based on a second channel of the signal; and
  determine a fourth relationship between the third value and the sixth value, wherein the oxygen saturation value is further based on the fourth relationship.

19. The system of claim 13, wherein a first location of the first data point within the signal is determined based on a first channel of the signal, the system further comprising computer-executable instructions to:
  determine a second location of a second channel of the signal that corresponds to the first location of the first channel; and
  determine the first value for the first data point based on the second location of the second channel.

20. The system of claim 13, further comprising computer-executable instructions to:
  determine, based on the second relationship between the second score and the one or more first threshold values, that the second data point comprises the other of the local maximum or the local minimum;
  determine a sixth value for a sixth data point that precedes the third data point and follows the first data point;
  determine a seventh value for a seventh data point that follows the third data point;
  determine a fifth difference between the third value and the sixth value;
  determine a sixth difference between the third value and the seventh value;
  determine a third score for the third data point based on the fifth difference and the sixth difference;
  determine, based on a third relationship between the third score and the one or more first threshold values, that the third data point comprises the other of the local maximum or the local minimum;
  determine a seventh difference between the second value for the second data point and the first value for the first data point;
  determine a distance between the second data point and the third data point; and
  determine a respiration rate value based in part on one or more of the seventh difference or the distance.

* * * * *

UNITED STATES PATENT AND TRADEMARK OFFICE
CERTIFICATE OF CORRECTION

| | | |
|---|---|---|
| PATENT NO. | : 12,440,110 B1 | Page 1 of 1 |
| APPLICATION NO. | : 17/449342 | |
| DATED | : October 14, 2025 | |
| INVENTOR(S) | : Anantharanga Prithviraj et al. | |

It is certified that error appears in the above-identified patent and that said Letters Patent is hereby corrected as shown below:

In the Claims

Column 26, Claim 16, BETWEEN Lines 56 and 57:
Currently reads:
"executable instructions to:
determine a lack of a data point comprising the other of"
When they should read:
--executable instructions to:
    determine, based on the second relationship between the second score and the one or more first threshold values, that the third data point comprises the one of the local maximum or the local minimum;
determine a lack of a data point comprising the other of--.

Signed and Sealed this
Second Day of December, 2025

John A. Squires
*Director of the United States Patent and Trademark Office*